(12) United States Patent
Chakraborty et al.

(10) Patent No.: US 11,122,327 B2
(45) Date of Patent: Sep. 14, 2021

(54) VIDEO RECORDING METHOD AND VIDEO RECORDING APPARATUS

(71) Applicant: HUAWEI TECHNOLOGIES CO., LTD., Guangdong (CN)

(72) Inventors: Chiranjib Chakraborty, Shenzhen (CN); Huamin Luo, Bristol (GB); Zhitao Wang, Shenzhen (CN); Ning Li, Chengdu (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/892,033

(22) Filed: Jun. 3, 2020

(65) Prior Publication Data
US 2020/0296447 A1    Sep. 17, 2020

Related U.S. Application Data

(63) Continuation of application No. PCT/CN2018/124135, filed on Dec. 27, 2018.

(30) Foreign Application Priority Data

Dec. 29, 2017    (CN) .......................... 201711490252.7

(51) Int. Cl.
*H04N 9/80*    (2006.01)
*H04N 21/434*    (2011.01)
(Continued)

(52) U.S. Cl.
CPC ... *H04N 21/4341* (2013.01); *H04N 21/23476* (2013.01); *H04N 21/4147* (2013.01); *H04N 21/4334* (2013.01)

(58) Field of Classification Search
CPC .............. H04N 21/44; H04N 21/4147; H04N 21/4627; H04N 21/4345; H04N 21/4367;
(Continued)

(56) References Cited

U.S. PATENT DOCUMENTS 7,660,513 B2    2/2010  Jin
7,734,155 B2    6/2010  Hanson et al.
(Continued)

FOREIGN PATENT DOCUMENTS

CN        201450545 U    5/2010
CN        103686333 A    3/2014
(Continued)

OTHER PUBLICATIONS

Extended European Search Report issued in European Application No. 18894655.2 dated Jul. 2, 2020, 9 pages.
(Continued)

*Primary Examiner* — Robert Chevalier
(74) *Attorney, Agent, or Firm* — Fish & Richardson P.C.

(57) ABSTRACT

This application discloses a video recording apparatus and a video recording method. The video recording apparatus includes a first demultiplexer, configured to: separate program information, audio data, and video data from a transport stream; a marker, configured to: mark the separated audio data and the separated video data, and transmit a mixed stream to an encryption processor, where the mixed stream includes the program information, the marked audio data, and the marked video data; and the encryption processor, configured to: identify the marked audio data and the marked video data in the mixed stream, encrypt the identified audio data and the identified video data to obtain encrypted audio data and encrypted video data, and transmit the encrypted audio data, the encrypted video data, and the program information to a memory in a rich execution environment REE for storage, so as to implement video recording.

12 Claims, 5 Drawing Sheets

(51) Int. Cl.
*H04N 21/2347* (2011.01)
*H04N 21/4147* (2011.01)
*H04N 21/433* (2011.01)

(58) Field of Classification Search
CPC .......... H04N 21/4341; H04N 21/4325; H04N 21/23476; H04N 21/4334; H04N 21/4405; H04N 21/4408; H04N 5/913; H04N 5/76; H04N 2005/91364; G11B 20/0021; G11B 20/00086
USPC ................ 386/241, 248, 249, 250, 285, 287
See application file for complete search history.

(56) References Cited

U.S. PATENT DOCUMENTS

| | | |
|---|---|---|
| 7,882,436 B2 | 2/2011 | Burke |
| 7,895,616 B2 | 2/2011 | Unger |
| 8,181,205 B2 | 5/2012 | Russ et al. |
| 8,565,578 B2 | 10/2013 | Plourde, Jr. et al. |
| 9,319,733 B2 | 4/2016 | Plourde, Jr. et al. |
| 2003/0002577 A1 | 1/2003 | Pinder |
| 2005/0047404 A1 | 3/2005 | Kim et al. |

FOREIGN PATENT DOCUMENTS

| | | |
|---|---|---|
| CN | 106101754 A | 11/2016 |
| EP | 0903036 A1 | 3/1999 |
| EP | 1610329 A2 | 12/2005 |
| GB | WO 2018/189505 | * 10/2018 |
| JP | 2003199009 A | 7/2003 |
| WO | 9746008 A1 | 12/1997 |
| WO | 2001082588 A2 | 11/2001 |
| WO | 2004040473 A2 | 5/2004 |
| WO | 2005057351 A2 | 6/2005 |

OTHER PUBLICATIONS

PCT International Search Report and Written Opinion issued in International Application No. PCT/CN2018/124135 dated Mar. 25, 2019, 15 pages (with English translation).

* cited by examiner

VIDEO RECORDING METHOD AND VIDEO RECORDING APPARATUS

CROSS-REFERENCE TO RELATED APPLICATIONS

This application is a continuation of International Application No. PCT/CN2018/124135, filed on Dec. 27, 2018, which claims priority to Chinese Patent Application No. 201711490252.7, filed on Dec. 29, 2017. The disclosures of the aforementioned applications are hereby incorporated by reference in their entireties.

TECHNICAL FIELD

This application relates to the field of digital video broadcasting (DVB), and in particular, to a video recording method and a video recording apparatus.

BACKGROUND

A conventional digital television set-top box allows a user to passively watch a television program. If the user does not watch a required television program in time, the user cannot watch the programs again. To resolve the foregoing problem, personal video recording (PVR) emerges. Specifically, the PVR technology can be used to record the television program to a storage device, so that the user can watch the recorded television program at any time.

FIG. 1 describes a structure of a DVB system. In the DVB system, a broadcast stream passes through a demodulator to obtain a transport stream, where the demodulator may be a tuner, and the transport stream is transmitted to a main control chip. The main control chip, served as a processor, is mainly configured to implement functions of demultiplexing and descrambling the transport stream. As shown in FIG. 1, the functions of demultiplexing and the descrambling are respectively implemented by a demultiplexer and a descrambler. The main control chip may further include a video decoder, an audio decoder, and an encryption engine (also referred to as an "encryption processor" hereinafter). Video data output by the descrambler is transmitted to the video decoder for video decoding, and audio data output by the descrambler is transmitted to the audio decoder for audio decoding. Data that needs to be protected output by the descrambler, for example, the video data and the audio data, further needs to be encrypted by the encryption engine and then stored in a memory, so as to implement video recording. Definitely, the video decoder, the audio decoder, and the encryption engine may be alternatively located outside the main control chip as independent hardware modules.

FIG. 2 shows an implementation solution of a PVR applied to the foregoing DVB system. The implementation solution includes two execution environments: a trusted execution environment (TEE) and a rich execution environment (REE). The TEE is a comparatively simple and secure execution environment in which software resources and hardware resources are secure and trusted. The REE is a rich and open execution environment in which there are more software resources and hardware resources, and the REE lacks security as the software resources and hardware resources are open to software. In this implementation solution, a transport stream passes through an REE-side demultiplexer to separate program information, audio data, and video data, and the audio data and the video data pass through a TEE-side descrambler to obtain descrambled audio data and descrambled video data. A TEE-side encryption processor encrypts a mixed stream that includes the program information, the descrambled audio data, and the descrambled video data to obtain ciphertext data, and the ciphertext data is transmitted to an REE-side memory for storage. When the stored data is played back, a TEE-side decryption processor obtains the ciphertext data stored in the memory, and decrypts the ciphertext data to obtain decrypted data, where the decrypted data is mixed data that includes the program information, the descrambled audio stream, and the descrambled video stream. A TEE-side demultiplexer separates the program information, the audio data, and the video data from the decrypted data, and copies the separated program information to an REE side to implement playback control on a recorded video.

In the foregoing implementation solution, after separating the program information from the decrypted data, the TEE-side demultiplexer copies the program information to the REE side. Because a copy function of the TEE-side demultiplexer is implemented by software, the software may be tampered with in the process of implementing the copy function by using the software. Consequently, the separated audio data or the separated video data (that is, the data that needs to be protected) is prone be copied to the REE side, causing leakage of the audio data or the video data.

SUMMARY

Embodiments of this application provide a video recording method and a video recording apparatus, to enhance security of audio data and video data during video recording.

According to a first aspect, this application provides a video recording apparatus, including:

a first demultiplexer, configured to separate program information, audio data, and video data from a transport stream;

a marker, configured to: mark the separated audio data and the separated video data, and transmit a mixed stream to an encryption processor, where the mixed stream includes the program information, the marked audio data, and the marked video data; and the encryption processor, configured to: identify the marked audio data and the marked video data in the mixed stream, encrypt the identified audio data and the identified video data to obtain encrypted audio data and encrypted video data, and transmit the encrypted audio data, the encrypted video data, and the program information to a memory in a rich execution environment REE for storage.

Because the marker marks the separated audio data and the separated video data, the encryption processor may identify the marked audio data and the marked video data in the mixed stream, encrypt only the audio data and the video data but not encrypt the program information during encryption, and transmit the encrypted audio data, the encrypted video data, and the unencrypted program information to the memory in the REE for storage. In this way, the unencrypted program information can be stored in the memory in the REE, and no leakage of audio data and video data is caused during transmission.

In a possible implementation, the video recording apparatus further includes:

a decryption processor, configured to: obtain stored data from the memory, and decrypt the encrypted audio data and the encrypted video data in the stored data to obtain decrypted audio data and decrypted video data, where the stored data includes the program information, the encrypted audio data, and the encrypted video data; and a second demultiplexer, configured to demultiplex the decrypted audio data and the decrypted video data to obtain output audio data and output video data, where the output audio data is to-be-played audio data, and the output video data is to-be-played video data.

In a possible implementation, the decryption processor is further configured to identify the encrypted audio data and the encrypted video data in the stored data.

In a possible implementation, the video recording apparatus further includes:

a descrambler, configured to: receive the separated audio data and the separated video data from the first demultiplexer, and descramble the received audio data and the received video data to obtain descrambled audio data and descrambled video data.

Correspondingly, the marker is specifically configured to add a descrambled identifier to the descrambled audio data and the descrambled video data, where the descrambled identifier is used to indicate that the descrambled audio data and the descrambled video data are descrambled data;

correspondingly, the encryption processor is specifically configured to identify the marked audio data and the marked video data in the mixed stream based on the descrambled identifier; and correspondingly, the decryption processor is specifically configured to identify the encrypted audio data and the encrypted video data in the stored data based on the descrambled identifier.

In a possible implementation, the marker is further configured to separately add check information to the separated audio data and the separated video data;

the encryption processor is further configured to verify integrity of the received audio data and integrity of the received video data in the mixed stream based on the check information that is separately added to the separated audio data and to the separated video data; and the decryption processor is further configured to verify integrity of the received audio data and integrity of the received video data in the stored data based on the check information that is separately added to the separated audio data and to the separated video data.

By introducing the foregoing verification mechanism, security of audio data and video data can be further ensured during transmission and storage.

In a possible implementation, the video recording apparatus further includes a parser, configured to parse the stored data obtained from the memory to obtain the program information, so as to implement playback control on the decrypted audio data and the decrypted video data.

According to a second aspect, this application provides a video recording method, including:

separating program information, audio data, and video data from a transport stream;

marking the separated audio data and the separated video data;

identifying the marked audio data and the marked video data in a mixed stream, where the mixed stream includes the program information, the marked audio data, and the marked video data; and encrypting the identified audio data and the identified video data to obtain encrypted audio data and encrypted video data, and transmitting the encrypted audio data, the encrypted video data, and the program information in the mixed stream to a memory in a rich execution environment REE for storage.

Because the marker marks the separated audio data and the separated video data, the encryption processor may identify the marked audio data and the marked video data in the mixed stream, encrypt only the audio data and the video data but not encrypt the program information, during encryption, and transmit the encrypted audio data, the encrypted video data, and the unencrypted program information to the memory in the REE for storage. In this way, the unencrypted program information can be stored in the memory in the REE, and no leakage of audio data and video data is caused during transmission.

In a possible implementation, the recording method further includes:

obtaining stored data from the memory, where the stored data includes the program information, the encrypted audio data, and the encrypted video data;

decrypting the encrypted audio data and the encrypted video data in the stored data to obtain decrypted audio data and decrypted video data; and demultiplexing the decrypted audio data and the decrypted video data to obtain output audio data and output video data, where the output audio data is to-be-played audio data, and the output video data is to-be-played video data.

In a possible implementation, before the decrypting the encrypted audio data and the encrypted video data in the stored data, the video recording method further includes:

identifying the encrypted audio data and the encrypted video data in the stored data.

In a possible implementation, before the marking the separated audio data and the separated video data, the video recording method further includes:

descrambling the separated audio data and the separated video data to obtain descrambled audio data and descrambled video data; and correspondingly, the marking the separated audio data and the separated video data including:

adding a descrambled identifier to the descrambled audio data and the descrambled video data, where the descrambled identifier is used to indicate that the descrambled audio data and the descrambled video data are descrambled data;

correspondingly, the identifying the marked audio data and the marked video data in a mixed stream includes:

identifying the marked audio data and the marked video data in the mixed stream based on the descrambled identifier; and correspondingly, the identifying the encrypted audio data and the encrypted video data in the stored data includes:

identifying the encrypted audio data and the encrypted video data in the stored data based on the descrambled identifier.

In a possible implementation, before the encrypting the identified audio data and the identified video data, the video recording method further includes:

separately adding check information to the separated audio data and the separated video data; and verifying integrity of the received audio data and integrity of the received video data in the mixed stream based on the check information that is separately added to the separated audio data and to the separated video data.

Correspondingly, before the decrypting the encrypted audio data and the encrypted video data in the stored data, the video recording method further includes:

verifying integrity of the received audio data and integrity of the received video data in the stored data based on the check information that is separately added to the separated audio data and to the separated video data.

By introducing the foregoing verification mechanism, security of audio data and video data can be further ensured during transmission and storage.

DESCRIPTION OF EMBODIMENTS

To make the objectives, technical solutions, and advantages of this application clearer, the following further describes this application in detail with reference to the accompanying drawings.

This application provides a video recording method and a video recording apparatus, to resolve a prior-art problem of leakage of audio data and video data. The method and the apparatus are based on a same inventive concept. Because principles for resolving problems according to the method and the apparatus are similar, mutual reference may be made to implementations of the apparatus and the method, and repeated content is not described.

Figure 1:
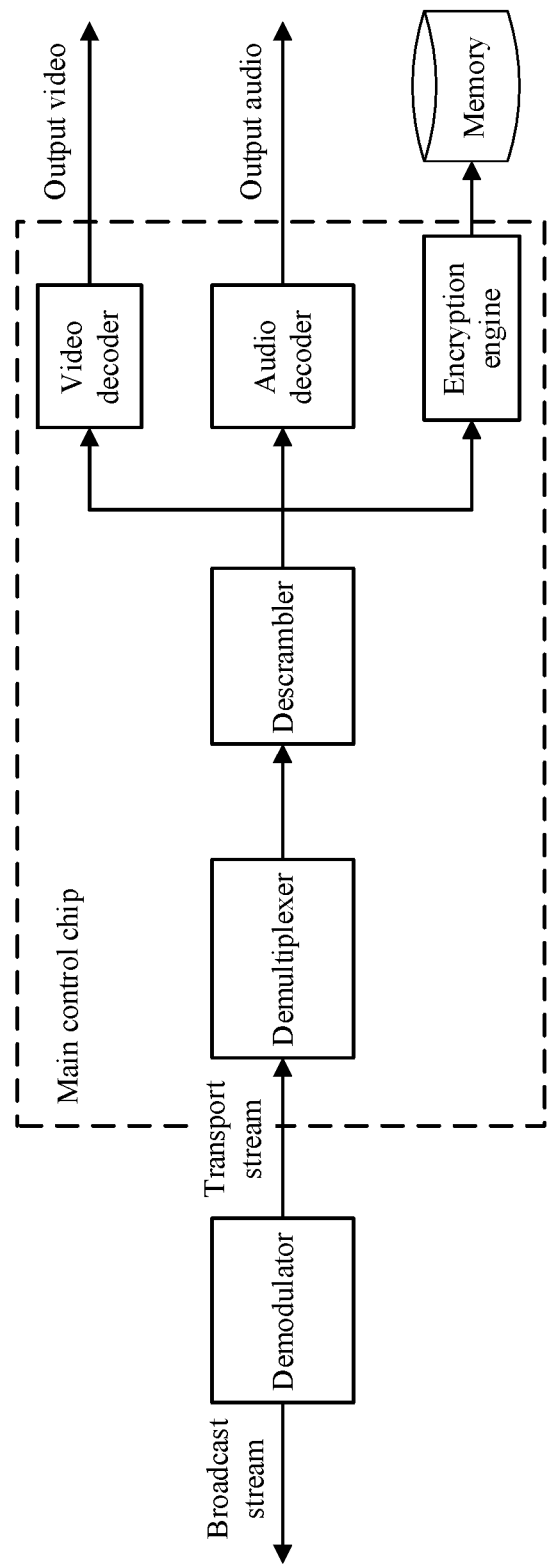
FIG. 1 is a structural diagram of digital video broadcasting DVB system according to this application.
Figure 2:
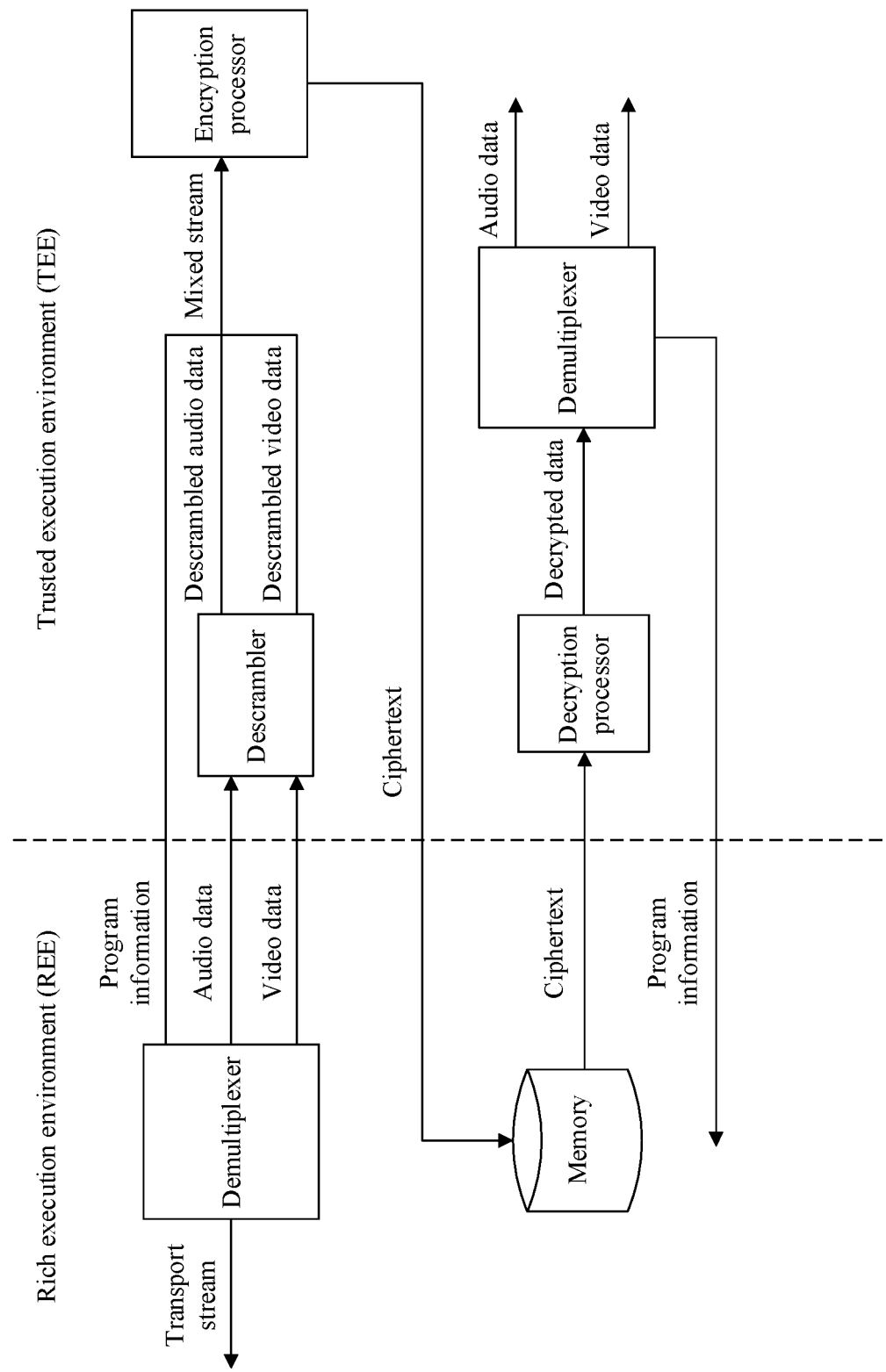
FIG. 2 is an implementation process of personal video recording PVR according to this application.

In this application, the embodiments are described with reference to a DVB system in FIG. 1. Typically, the DVB system may be a set-top box system, or certainly may be another digital broadcasting system. This is not limited in this application.

Figure 3:
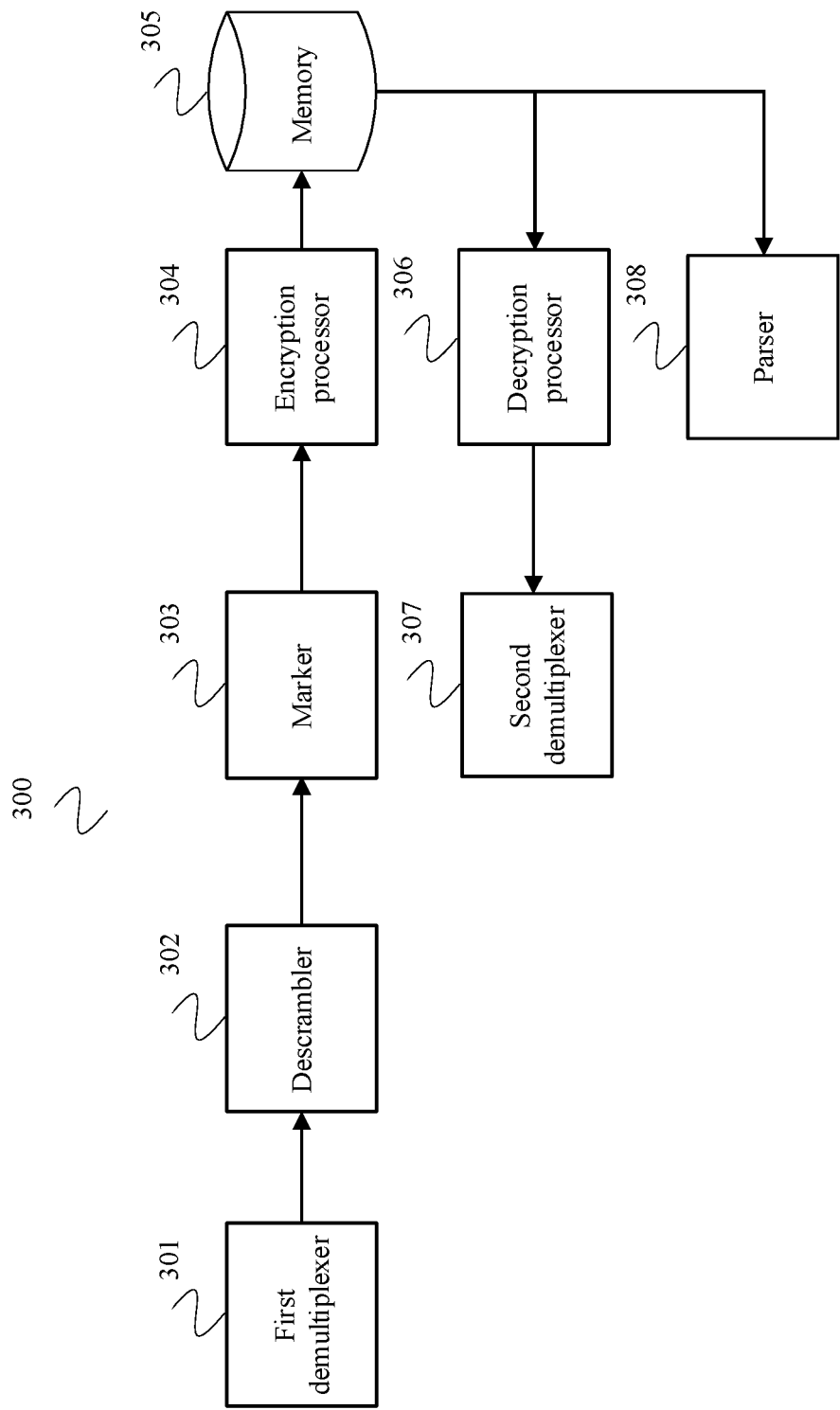
FIG. 3 is a structural diagram of a video recording apparatus according to an embodiment of this application.
Figure 4:
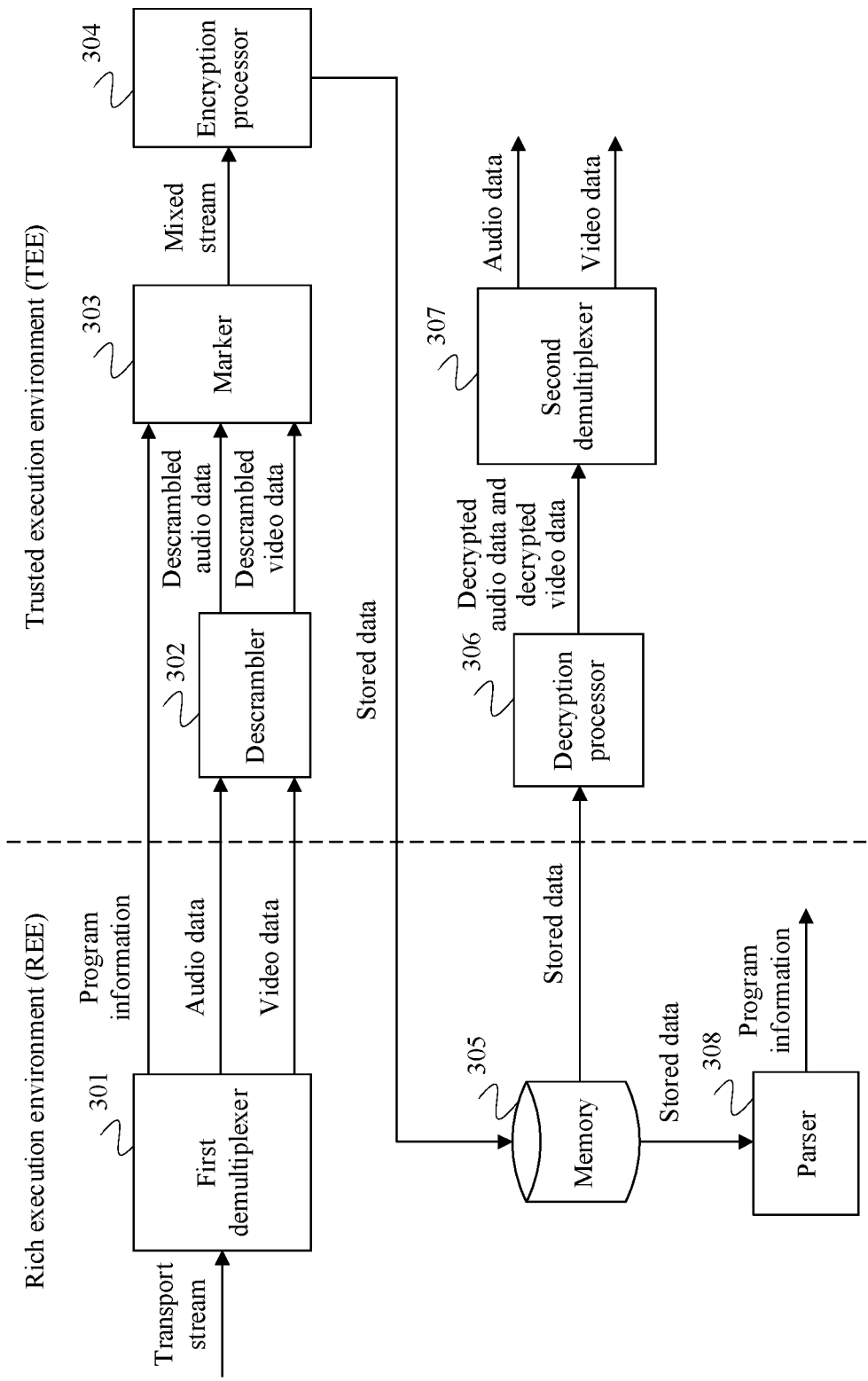
FIG. 4 is another implementation process of personal video recording PVR according to an embodiment of this application.

FIG. 3 shows a video recording apparatus 300 applied to a DVB system according to this application. To describe functions of components in the video recording apparatus 300 and interaction between the components more clearly, FIG. 4 provides a signal flow diagram of interaction between components, in an REE and a TEE, in the video recording apparatus 300. Therefore, for understanding the functions of the components in the video recording apparatus 300, refer to FIG. 4.

Specifically, the video recording apparatus 300 includes:

a first demultiplexer 301, configured to separate program information, audio data, and video data from a transport stream, where the program information is used to provide auxiliary information for media content in the transport stream, so as to obtain content of a channel, and the program information may include channel information, a program type, a program time, a program source, and the like;

a descrambler 302, configured to descramble the received audio data and the received video data to obtain descrambled audio data and descrambled video data, where the descrambled audio data and the descrambled video data are to-be-protected clear data;

a marker 303, configured to: mark the descrambled audio data and the descrambled video data, and transmit a mixed stream that includes the marked audio data, the marked video data, and the program information to an encryption processor 304; and the encryption processor 304, configured to: identify the marked audio data and the marked video data in the mixed stream, encrypt the identified audio data and the identified video data to obtain encrypted audio data and encrypted video data, and transmit stored data including the encrypted audio data, the encrypted video data, and the program information to a memory 305 in a rich execution environment REE for storage. For ease of description, in FIG. 4, the stored data is used to represent the encrypted audio data, the encrypted video data, and the program information.

In this application, the encryption processor 304, served as an encryption engine, is hardware logic configured to provide a data encryption service. The encryption processor 304 may be a coprocessor integrated into a processor, or may be a hardware encryption card. Because the encryption processor 304 is implemented by using the hardware logic, no data leakage occurs after the encryption processor 304 transmits the encrypted audio data, the encrypted video data, and the program information to the memory 305 in the REE. Similarly, the following described decryption processor 306, served as a decryption engine, is hardware logic configured to provide a data decryption service. The decryption processor 306 may be a coprocessor integrated into a processor, or may be a hardware decryption card. It should be noted that the encryption processor 304 and the decryption processor 306 may be integrated hardware logic with encryption and decryption functions.

It should be noted that the memory 305 may be disposed inside the video recording apparatus 300, or may be disposed outside the video recording apparatus 300.

In an embodiment, the video recording apparatus 300 may further play back audio data and video data that are stored in the memory 305. Specifically, the video recording apparatus 300 further includes:

a decryption processor 306, configured to: obtain, from the memory 305, the stored data including the encrypted audio data, the encrypted video data, and the program information; identify the encrypted audio data and the encrypted video data in the stored data; and decrypt the encrypted audio data and the encrypted video data to obtain decrypted audio data and decrypted video data; and a second demultiplexer 307, configured to: demultiplex the decrypted audio data and the decrypted video data to obtain output audio data and output video data, where the output audio data and the output video data that are obtained through demultiplexing are respectively to-be-played audio data and to-be-played video data, where it should be noted that the second demultiplexer 307 and the first demultiplexer 301 may be a same demultiplexer; and a parser 308, configured to parse the stored data obtained from the memory 305 to obtain the program information, so as to implement playback control on the decrypted audio data and the decrypted video data.

In an embodiment, the marker 303 may specifically implement the foregoing functions as follows:

the marker 303 adds a descrambled identifier to the separated audio data and the separated video data, where the descrambled identifier is used to indicate that the separated audio data and the separated video data are descrambled data. For example, the descrambled identifier may be set to "0" or "1".

Correspondingly, the encryption processor 304 may identify the marked audio data and the marked video data in the mixed stream based on the descrambled identifier.

Similarly, the decryption processor 306 may identify the encrypted audio data and the encrypted video data in the stored data based on the descrambled identifier.

In an embodiment, the marker 303 is further configured to separately add check information to the separated audio data and the separated video data. The check information may be cyclic redundancy check (CRC), parity check, or the like. The check information is not specifically limited in this application.

Correspondingly, the encryption processor 304 is further configured to verify integrity of the received audio data and the received video data in the mixed stream based on the check information separately added to the audio data and the video data. When the integrity verification succeeds, it indicates that the audio data and the video data in the mixed stream received by the encryption processor 304 are not tampered with during transmission, so that the encryption processor 304 may perform a further encryption operation. When the integrity verification fails, it indicates that the audio data and the video data in the mixed stream received by the encryption processor 304 may be tampered with during transmission.

Similarly, the decryption processor 306 is further configured to verify integrity of the received audio data and the received video data in the stored data based on the check information separately added to the audio data and the video data. When integrity verification succeeds, it indicates that the audio data and the video data in the stored data received by the decryption processor 306 are not tampered with, so that the decryption processor 306 may perform a further decryption operation. When the integrity verification fails, it indicates that the audio data and the video data in the stored data received by the decryption processor 306 may be tampered with.

By introducing the foregoing verification mechanism, security of audio data and video data can be further ensured during transmission and storage.

In the foregoing recording apparatus 300, because a trusted execution environment TEE includes no file system, recorded data can be stored only on an REE side. Therefore, the memory 305 is located on the REE side. In addition to the memory 305, the first multiplexer 301 and the parser 308 are also located on the REE side. The descrambler 302, the marker 303, the encryption processor 304, the decryption processor 306, and the second demultiplexer 307 are located on the TEE side. When the first demultiplexer 301 and the second demultiplexer 307 are a same demultiplexer, the first demultiplexer 301 or the second demultiplexer 307 may work in the TEE or the REE.

In the foregoing embodiment, because the marker marks the separated audio data and the separated video data, the encryption processor may identify the marked audio data and the marked video data in the mixed stream, encrypt only the audio data and the video data but not encrypt the program information, during encryption, and transmit the encrypted audio data, the encrypted video data, and the unencrypted program information to the memory in the REE for storage. In this way, the unencrypted program information can be stored in the memory in the REE, and no leakage of audio data and video data is caused during transmission.

Figure 5:
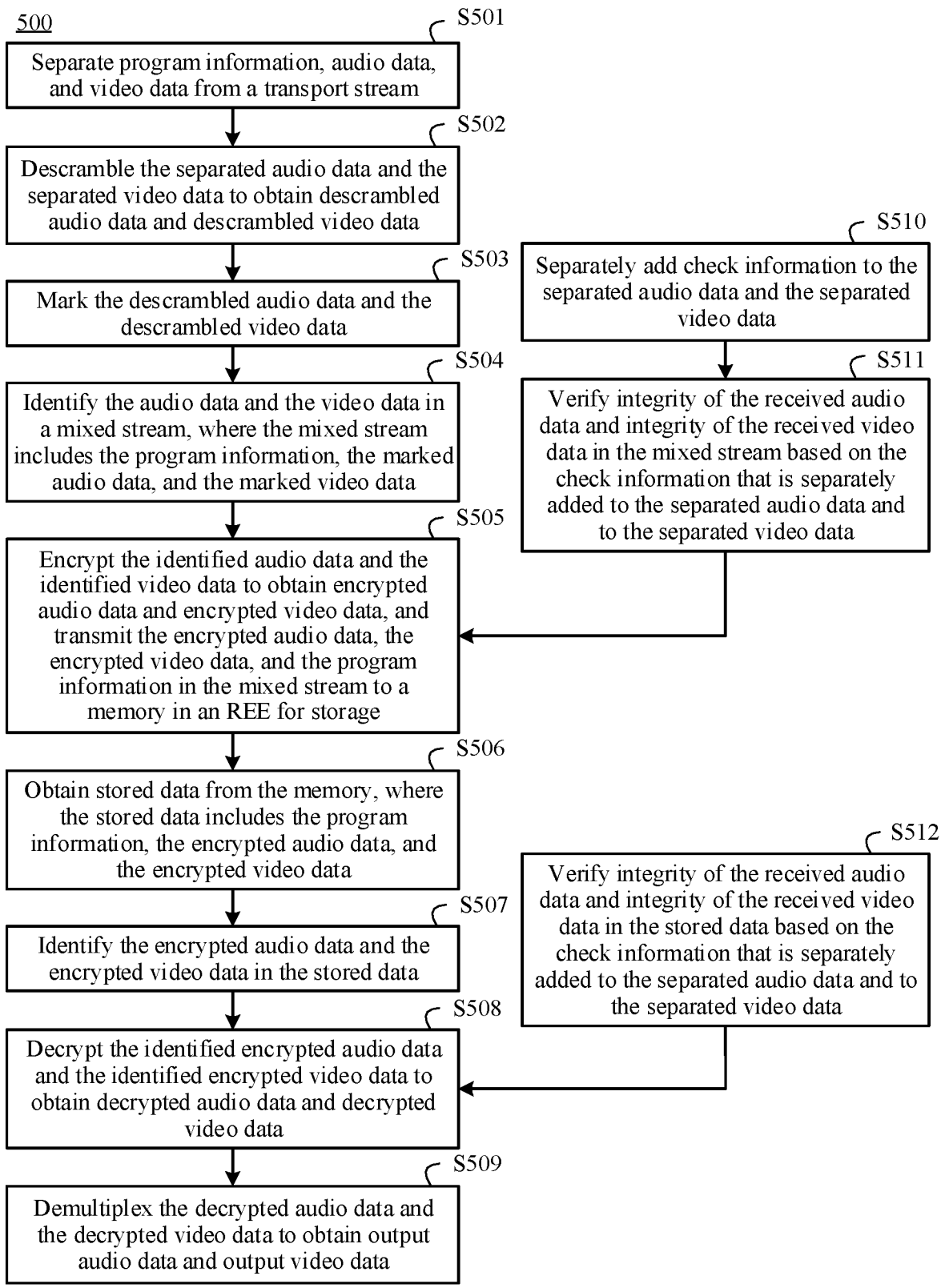
FIG. 5 is a flowchart of a video recording method according to an embodiment of this application.

Based on the foregoing descriptions, FIG. 5 is a schematic flowchart corresponding to a video recording method 500 according to an embodiment of this application. Specifically, the method includes the following steps.

S501. Separate program information, audio data, and video data from a transport stream.

S502. Descramble the separated audio data and the separated video data to obtain descrambled audio data and descrambled video data.

S503. Mark the descrambled audio data and the descrambled video data.

Specifically, a descrambled identifier is added to the descrambled audio data and the descrambled video data, where the descrambled identifier is used to indicate that the descrambled audio data and the descrambled video data are descrambled data.

S504. Identify the marked audio data and the marked video data in a mixed stream, where the mixed stream includes the program information, the marked audio data, and the marked video data.

Specifically, the audio data and the video data in the mixed stream may be identified based on the descrambled identifier.

S505. Encrypt the identified audio data and the identified video data to obtain encrypted audio data and encrypted video data, and transmit the encrypted audio data, the encrypted video data, and the program information in the mixed stream to a memory in an REE for storage.

In an embodiment, after the encrypted audio data, the encrypted video data, and the program information in the mixed stream are stored in the memory in the REE, the stored audio data and the stored video data may be further played back. Therefore, the video recording method further includes the following steps.

S506. Obtain stored data from the memory, where the stored data includes the program information, the encrypted audio data, and the encrypted video data.

S507. Identify the encrypted audio data and the encrypted video data in the stored data.

Specifically, the encrypted audio data and the encrypted video data may be identified in the stored data based on the descrambled identifier, and non-audio data and non-video data, such as the program information, may be discarded.

S508. Decrypt the identified encrypted audio data and the identified encrypted video data to obtain decrypted audio data and decrypted video data.

S509. Demultiplex the decrypted audio data and the decrypted video data to obtain output audio data and output video data.

The output audio data is to-be-played audio data, and the output video data is to-be-played video data.

Further, the program information stored in the memory in the REE may be parsed in the REE by another component such as a parser, so as to implement playback control on the output audio data and the output video data.

In an embodiment, to further ensure security of audio data and video data during transmission and storage, a security verification mechanism may be introduced. Specifically, before the identified audio data and the identified video data are encrypted in step S505, the video recording method further includes the following steps.

S510. Separately add check information to the separated audio data and the separated video data.

S511. Verify integrity of the received audio data and integrity of the received video data in the mixed stream based on the check information that is separately added to the separated audio data and to the separated video data.

When integrity verification succeeds, it indicates that the audio data and the video data in the mixed stream are not tampered with during transmission, so that a further encryption operation may be performed.

Similarly, before the identified encrypted audio data and the identified encrypted video data are decrypted in step S508, the video recording method further includes the following step.

S512. Verify integrity of the received audio data and integrity of the received video data in the stored data based on the check information that is separately added to the separated audio data and to the separated video data.

When integrity verification succeeds, it indicates that the audio data and the video data in the stored data are not tampered with, so that a further decryption operation may be performed.

By introducing the foregoing verification mechanism, security of audio data and video data can be further ensured during transmission and storage.

In the foregoing embodiment, because the marker marks the separated audio data and the separated video data, the encryption processor may identify the audio data and the video data in the mixed stream, encrypt only the audio data and the video data but not encrypt the program information, during encryption, and transmit the encrypted audio data, the encrypted video data, and the unencrypted program information to the memory in the REE for storage. In this way, the unencrypted program information can be stored in the memory in the REE, and no leakage of audio data and video data is caused during transmission.

In the examples described in the embodiments disclosed in this application, units and method processes may be implemented by electronic hardware or a combination of computer software and electronic hardware. Whether the functions are performed by hardware or software depends on particular applications and design constraint conditions of the technical solutions. A person skilled in the art may implement the described functions for each specific application by using different methods.

In the several embodiments provided in this application, it should be understood that the disclosed apparatus and method may be implemented in other manners. For example, the described apparatus embodiments are merely examples. For example, the module division is merely logical function division and may be another division in an actual implementation. For example, a plurality of units or components may be combined or integrated into another system, or some steps may be ignored or not performed. In addition, coupling, direct coupling, or a communication connection between the units may be implemented by using some interfaces, and these may be in an electronic form, a mechanical form, or another form.

The units described as separate parts may or may not be physically separate, and may be located in one position, or may be distributed on a plurality of network units.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A video recording apparatus, comprising:
   a first demultiplexer, configured to separate program information, audio data, and video data from a transport stream;
   a marker, configured to: mark the separated audio data and the separated video data, and transmit a mixed stream to an encryption processor, wherein the mixed stream comprises the program information, the marked audio data, and the marked video data; and
   the encryption processor, configured to: identify the marked audio data and the marked video data in the mixed stream, encrypt the identified audio data and the identified video data to obtain encrypted audio data and encrypted video data, and transmit the encrypted audio data, the encrypted video data, and the program information to a memory in a rich execution environment (REE) for storage.

2. The apparatus according to claim 1, further comprising:
   a decryption processor, configured to: obtain stored data from the memory, and decrypt the encrypted audio data and the encrypted video data in the stored data to obtain decrypted audio data and decrypted video data, wherein the stored data comprises the program information, the encrypted audio data, and the encrypted video data; and
   a second demultiplexer, configured to demultiplex the decrypted audio data and the decrypted video data to obtain output audio data and output video data.

3. The apparatus according to claim 2, wherein
   the decryption processor is further configured to identify the encrypted audio data and the encrypted video data in the stored data.

4. The apparatus according to claim 2, further comprising:
   a descrambler, configured to: receive the separated audio data and the separated video data from the first demultiplexer, and descramble the received audio data and the received video data to obtain descrambled audio data and descrambled video data; wherein
   the marker is configured to:
     separately add a descrambled identifier to the descrambled audio data and the descrambled video data, wherein the descrambled identifier indicates that the descrambled audio data and the descrambled video data are descrambled data;
   the encryption processor is configured to:
     identify the marked audio data and the marked video data in the mixed stream based on the descrambled identifier; and
   the decryption processor is configured to:
     identify the encrypted audio data and the encrypted video data in the stored data based on the descrambled identifier.

5. The apparatus according to claim 2, wherein
   the marker is further configured to separately add check information to the separated audio data and the separated video data;
   the encryption processor is further configured to verify integrity of the received audio data and integrity of the received video data in the mixed stream based on the check information that is separately added to the separated audio data and to the separated video data; and the decryption processor is further configured to verify integrity of the received audio data and integrity of the received video data in the stored data based on the check information that is separately added to the separated audio data and to the separated video data.

6. A video recording method, comprising:

separating program information, audio data, and video data from a transport stream;

marking the separated audio data and the separated video data;

identifying the marked audio data and the marked video data in a mixed stream, wherein the mixed stream comprises the program information, the marked audio data, and the marked video data; and encrypting the identified audio data and the identified video data to obtain encrypted audio data and encrypted video data, and transmitting the encrypted audio data, the encrypted video data, and the program information in the mixed stream to a memory in a rich execution environment REE for storage.

7. The method according to claim 6, further comprising:

obtaining stored data from the memory, wherein the stored data comprises the program information, the encrypted audio data, and the encrypted video data;

decrypting the encrypted audio data and the encrypted video data in the stored data to obtain decrypted audio data and decrypted video data; and demultiplexing the decrypted audio data and the decrypted video data to obtain output audio data and output video data.

8. The method according to claim 7, wherein before the decrypting the encrypted audio data and the encrypted video data in the stored data, the method further comprises:

identifying the encrypted audio data and the encrypted video data in the stored data.

9. The method according to claim 8, wherein before the marking the separated audio data and the separated video data, the method further comprises:

descrambling the separated audio data and the separated video data to obtain descrambled audio data and descrambled video data; wherein the marking the separated audio data and the separated video data comprises:

separately adding a descrambled identifier to the descrambled audio data and the descrambled video data, wherein the descrambled identifier indicates that the descrambled audio data and the descrambled video data are descrambled data;

the identifying the marked audio data and the marked video data in a mixed stream comprises:

identifying the marked audio data and the marked video data in the mixed stream based on the descrambled identifier; and the identifying the encrypted audio data and the encrypted video data in the stored data comprises:

identifying the encrypted audio data and the encrypted video data in the stored data based on the descrambled identifier.

10. The method according to claim 7, wherein before the encrypting the identified audio data and the identified video data, the method further comprises:

separately adding check information to the separated audio data and the separated video data; and verifying integrity of the received audio data and integrity of the received video data in the mixed stream based on the check information that is separately added to the separated audio data and to the separated video data; and wherein before the decrypting the encrypted audio data and the encrypted video data in the stored data, the method further comprises:

verifying integrity of the received audio data and integrity of the received video data in the stored data based on the check information that is separately added to the separated audio data and to the separated video data.

11. The apparatus according to claim 2, wherein the output audio data is to-be-played audio data, and the output video data is to-be-played video data.

12. The method according to claim 7, wherein the output audio data is to-be-played audio data, and the output video data is to-be-played video data.

* * * * *